US009714694B2

(12) United States Patent
Staley et al.

(10) Patent No.: US 9,714,694 B2
(45) Date of Patent: Jul. 25, 2017

(54) HIGH DAMPING LOW FORCE HYDRAULIC STRUT TENSIONER

(71) Applicant: GM Global Technology Operations LLC, Detroit, MI (US)

(72) Inventors: Eric D. Staley, Flushing, MI (US); David R. Staley, Flushing, MI (US); Robert S. McAlpine, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 14/841,984

(22) Filed: Sep. 1, 2015

(65) Prior Publication Data

US 2017/0059010 A1  Mar. 2, 2017

(51) Int. Cl.
*F16H 7/08* (2006.01)
*F16H 7/02* (2006.01)
*F16H 7/06* (2006.01)

(52) U.S. Cl.
CPC .............. *F16H 7/0838* (2013.01); *F16H 7/02* (2013.01); *F16H 7/06* (2013.01); *F16H 2007/0812* (2013.01); *F16H 2007/0872* (2013.01); *F16H 2007/0893* (2013.01)

(58) Field of Classification Search
CPC . F16H 7/0838; F16H 7/02; F16H 7/06; F16H 2007/0812; F16H 2007/0872; F16H 2007/0893
USPC .......................................................... 474/110
See application file for complete search history.

(56) References Cited

U.S. PATENT DOCUMENTS

| 2002/0128099 | A1* | 9/2002 | Winklhofer | F01L 1/02 |
| | | | | 474/102 |
| 2009/0235524 | A1* | 9/2009 | Iwagami | F01L 1/02 |
| | | | | 29/888.01 |
| 2017/0030434 | A1* | 2/2017 | Kunimatsu | F16H 7/0838 |
| 2017/0030452 | A1* | 2/2017 | Yamauchi | F16H 55/30 |

* cited by examiner

*Primary Examiner* — William E Dondero
*Assistant Examiner* — Robert T Reese
(74) *Attorney, Agent, or Firm* — Harness, Dickey & Pierce, P.L.C.

(57) ABSTRACT

A tensioner device, includes a housing defining a cylindrical bore. A plunger is disposed in the bore and has a non-cylindrical outer surface. A spring is engaged with the plunger for biasing the plunger in an outward direction and an oil passage is in communication with the cylindrical bore for delivering pressurized oil to the bore. The non-cylindrical outer surface provides hydraulic clearance areas between the plunger and the bore to provide improved damping without high damping force.

16 Claims, 3 Drawing Sheets

HIGH DAMPING LOW FORCE HYDRAULIC STRUT TENSIONER

FIELD

The present disclosure relates to a hydraulic belt or chain tensioner with improved damping performance.

BACKGROUND AND SUMMARY

This section provides background information related to the present disclosure which is not necessarily prior art.

Hydraulic tensioners are used for applying tension against a chain or belt for preventing chain rattle or belt slippage in an auxiliary drive system of an engine or in other industrial machines. In a typical hydraulic tensioner as illustrated in FIG. 4a, a cylindrical plunger 100 is disposed within a cylindrical bore 102 of a housing and is biased against a tensioner shoe for applying a tension force against a belt or chain. A high pressure oil is introduced into the bore 102 for damping movement of the plunger. The oil is forced from the high-pressure chamber where it passes through a clearance 104 around the plunger 100 and into the chain cavity. Typically, to create high amounts of damping without high damping force, a hydraulic tensioner requires a larger clearance between the plunger and the bore. The high clearance makes it difficult to keep the plunger concentric with the bore during operation, which makes it prone to binding or stiction (tendency to bind or stick due to friction). With a limited clearance 104 due to the requirement of concentricity between the plunger 100 and bore 102, the force verses plunger displacement curve as shown in FIG. 4b has a limited damping capability. Accordingly, it is desirable to provide a tension device with improved damping while maintaining concentricity between the plunger and the bore.

According to the present disclosure, a hydraulic chain or belt tensioner is provided with a plunger having a non-round profile within the cylindrical bore allowing for concentric position of the plunger relative to the bore that can be minimized, while the effective hydraulic clearance can be increased to provide higher damping with less damping force.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Figure 1:
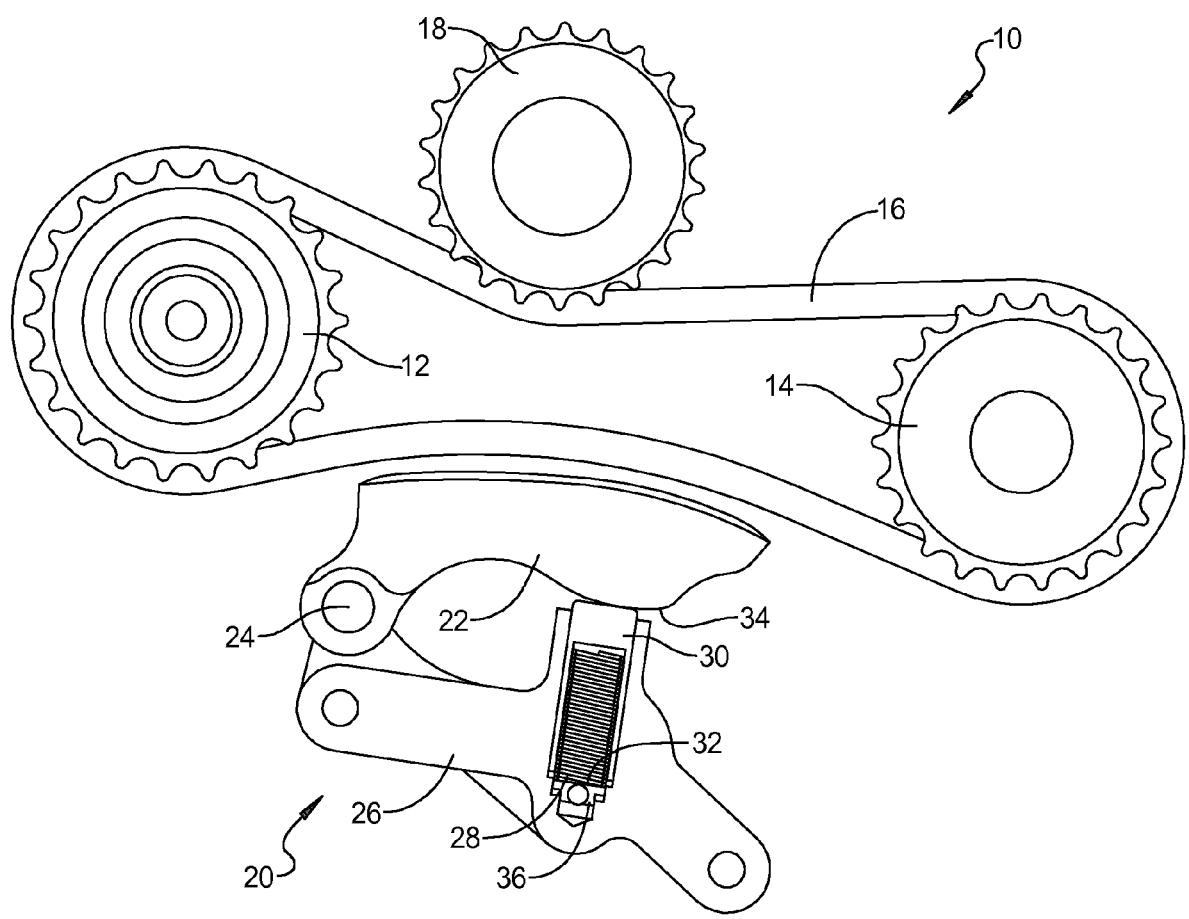
FIG. 1 is a schematic illustration of a belt or chain drive system employing a tensioner device according to the principles of the present disclosure.

With reference to FIG. 1, a chain or belt drive system 10 is shown including a first sprocket or pulley 12 and a second sprocket or pulley 14. A belt or chain 16 is shown drivingly engaged with the first sprocket or pulley 12 and the second sprocket or pulley 14. Additional sprockets or pulleys 18 can also be engaged with the belt or chain 16 for providing or receiving drive torque to/from various components of an engine or other industrial machine. A tensioner device 20 is provided in engagement with the belt or chain 16 for applying a tensioning force thereto.

The tensioner device 20 can include a pivoting shoe 22 that engages the belt or chain 16 and is pivotable about a pivot 24. A housing or other support structure 26 defines a cylindrical bore 28. A plunger 30 is received in the bore 28 along with a spring 32 that biases the plunger 30 in an outward direction against an opposing surface 34 of the shoe 22. An oil passage 36 is provided in communication with the cavity 28 for providing pressurized oil to the cavity 28.

Figure 2A:
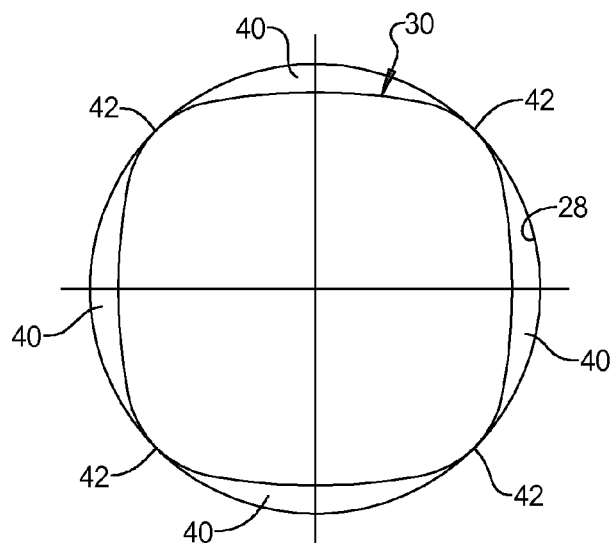
FIG. 2a is a schematic illustration of the non-round profile plunger disposed within the cylindrical bore for providing greater hydraulic clearance while maintaining high concentricity between the plunger and the bore.
Figure 2B:
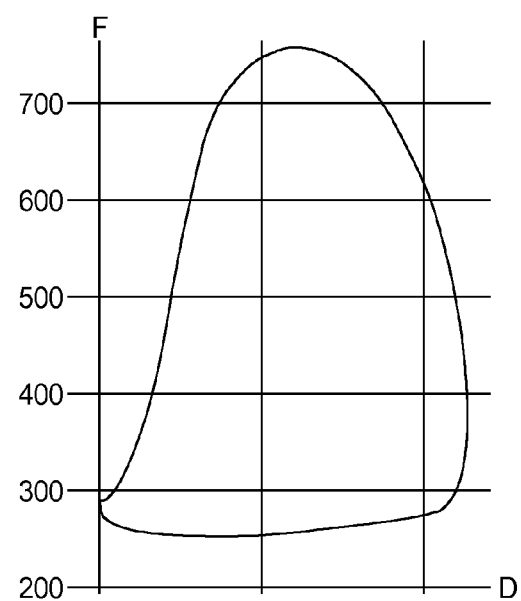
FIG. 2b is a graph illustrating the force verses plunger displacement curve for the non-round profile plunger according to the principles of the present disclosure.
Figure 4A:
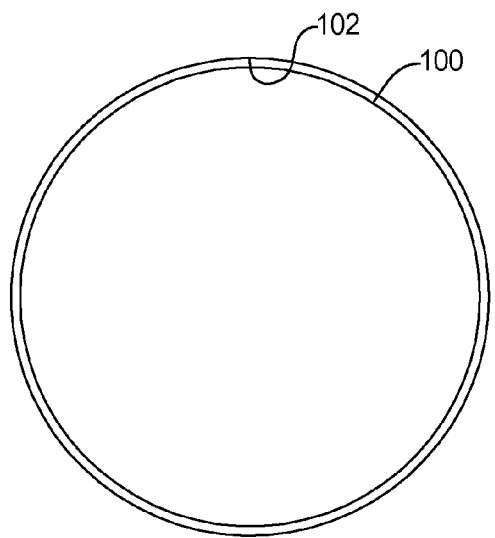
FIG. 4a is a schematic illustration of a conventional round profile plunger disposed within the cylindrical bore.
Figure 4B:
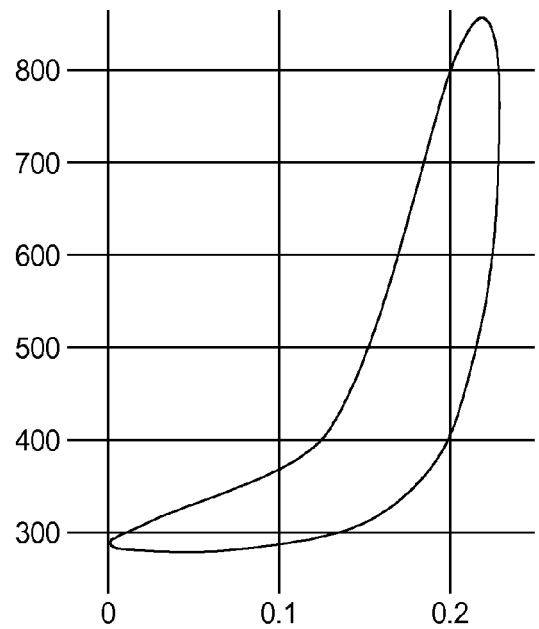
FIG. 4b is a graph illustrating the force verses plunger displacement curve for the conventional round profile plunger.

The spring 32 maintains a biasing force against the plunger 30 while the pressurized oil within the cavity damps movement of the plunger 30 to prevent chain or belt rattle or slip. The displacement of the plunger effectively pumps oil from a source and the resistance to flow around the plunger causes an increase in pressure which also creates a reaction force against the plunger that inhibits or damps its motion. The oil supply also includes a check valve to prevent back flowing of oil due to plunger displacement. As shown in FIG. 2a, the plunger 30 has a non-round profile that can be generated by cycloid mathematics that can have low clearance regions 42 with high concentricity with the cylindrical bore 28, while enhanced hydraulic clearance areas 40 are provided between the non-round profile of the plunger 30 and the cylindrical bore 28. The enhanced hydraulic clearance areas 40 are disposed between the concentric contact regions 42 and increase the effective hydraulic diameter to provide higher flow with less damping force, as shown in the graph of FIG. 2b where a greater range of displacement D is achieved with less force F as compared to the conventional design of FIGS. 4a, 4b.

Figure 3:
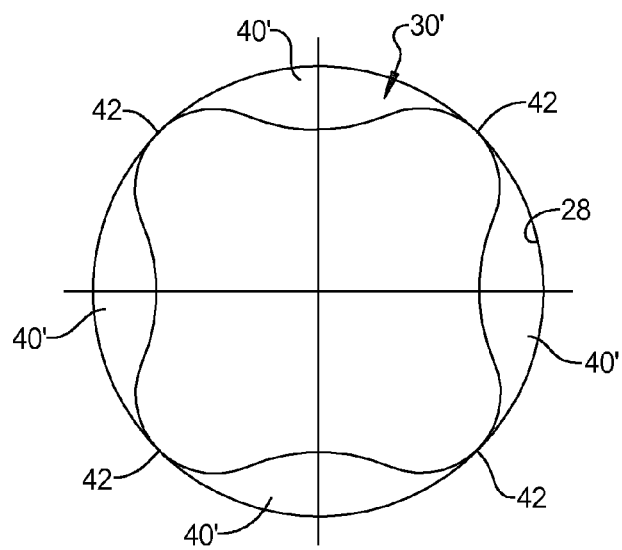
FIG. 3 is a schematic illustration of an alternative non-round profile plunger disposed within the cylindrical bore for providing greater hydraulic clearance while maintaining high concentricity between the plunger and the bore according to the principles of the present disclosure.

With reference to FIG. 3, cycloid mathematics can be used to describe a variety of non-round profile shapes that can be used for the plunger 30' with deeper cut clearance areas 40'. In addition, different numbers of clearance areas 40 and concentric contact regions 42 can be used depending upon the desired application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tensioner device, comprising:
a housing defining a cylindrical bore;
a plunger disposed in said bore, said plunger having a non-cylindrical outer surface;
a spring engaged with the plunger for biasing the plunger in an outward direction; and
an oil passage in communication with the cylindrical bore for delivering pressurized oil to the bore.

2. The tensioner device according to claim 1, further comprising a pivoting shoe that is engaged with the plunger.

3. The tensioner device according to claim 2, wherein the pivoting shoe is adapted to engage a belt or chain for applying a tension force there against.

4. The tensioner device according to claim 1, wherein the non-cylindrical outer surface of the plunger includes a plurality of low clearance regions that are concentric to and in sliding engagement with the cylindrical bore.

5. The tensioner device according to claim 4, wherein the non-cylindrical outer surface of the plunger includes a plurality of clearance regions disposed between the contact regions.

6. The tensioner device according to claim 1, wherein the non-cylindrical outer surface of the plunger is a cycloid.

7. A chain drive system, comprising:
a first sprocket;
a second sprocket;
a chain drivingly engaged with the first and second sprockets; and
a tensioner device having a housing defining a cylindrical bore, a plunger disposed in said bore, said plunger having a non-cylindrical outer surface, a spring engaged with the plunger for biasing the plunger in an outward direction, and an oil passage in communication with the cylindrical bore for delivering pressurized oil to the bore.

8. The chain drive system according to claim 7, further comprising a pivoting shoe that is engaged with the plunger and the chain for applying a tension force against the chain.

9. The chain drive system according to claim 7, wherein the non-cylindrical outer surface of the plunger includes a plurality of low clearance regions that are concentric to and in sliding engagement with the cylindrical bore.

10. The chain drive system according to claim 9, wherein the non-cylindrical outer surface of the plunger includes a plurality of clearance regions disposed between the contact regions.

11. The chain drive system according to claim 7, wherein the non-cylindrical outer surface of the plunger is a cycloid.

12. A belt drive system, comprising:
a first pulley;
a second pulley;
a belt drivingly engaged with the first and second pulleys; and
a tensioner device having a housing defining a cylindrical bore, a plunger disposed in said bore, said plunger having a non-cylindrical outer surface, a spring engaged with the plunger for biasing the plunger in an outward direction, and an oil passage in communication with the cylindrical bore for delivering pressurized oil to the bore.

13. The belt drive system according to claim 12, further comprising a pivoting shoe that is engaged with the plunger and the belt for applying a tension force against the belt.

14. The belt drive system according to claim 12, wherein the non-cylindrical outer surface of the plunger includes a plurality of contact regions that are concentric to and in sliding engagement with the cylindrical bore.

15. The belt drive system according to claim 14, wherein the non-cylindrical outer surface of the plunger includes a plurality of clearance regions disposed between the contact regions.

16. The belt drive system according to claim 12, wherein the non-cylindrical outer surface is a cycloid.

* * * * *